(12) United States Patent
Datta et al.

(10) Patent No.: US 7,633,770 B2
(45) Date of Patent: Dec. 15, 2009

(54) COLLECTION AND TRANSMISSION SYSTEM

(75) Inventors: Rajib Datta, Niskayuna, NY (US); Christof Martin Sihler, Hallbergmoos (DE); Richard S. Zhang, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 350 days.

(21) Appl. No.: 11/608,570

(22) Filed: Dec. 8, 2006

(65) Prior Publication Data

US 2008/0137382 A1 Jun. 12, 2008

(51) Int. Cl.
*H02J 3/36* (2006.01)
*H02M 5/44* (2006.01)

(52) U.S. Cl. ............................. 363/35; 363/51; 363/68
(58) Field of Classification Search .................. 363/35, 363/51–54, 56.04, 68
See application file for complete search history.

(56) References Cited

U.S. PATENT DOCUMENTS

| | | | |
|---|---|---|---|
| 3,530,362 A * | 9/1970 | Filimonov et al. ............ 363/68 |
| 3,968,419 A | 7/1976 | Ekstrom | |
| 4,019,115 A | 4/1977 | Lips | |
| 4,797,801 A * | 1/1989 | Furuhashi et al. ............. 363/43 |
| 4,837,671 A | 6/1989 | Wild et al. | |
| 4,894,763 A * | 1/1990 | Ngo ........................... 363/35 |
| 6,670,721 B2 | 12/2003 | Lof et al. | |
| 6,751,106 B2 | 6/2004 | Zhang et al. | |
| 2006/0126242 A1 | 6/2006 | Datta et al. | |
| 2006/0227578 A1 | 10/2006 | Datta et al. | |

FOREIGN PATENT DOCUMENTS

| | | |
|---|---|---|
| DE | 19847680 A1 | 10/1998 |
| GB | 1420984 | 1/1976 |
| GB | 1520884 | 8/1978 |
| GB | 2397445 A | 7/2004 |
| JP | 11089235 A | 9/2000 |
| JP | 2000245066 A | 9/2000 |
| WO | WO0152379 A2 | 7/2001 |

* cited by examiner

*Primary Examiner*—Jeffrey L Sterrett
*Assistant Examiner*—Fred E Finch, III
(74) *Attorney, Agent, or Firm*—Ann M. Agosti

(57) ABSTRACT

A collection and transmission system includes: a system direct current (DC) link configured for carrying power from a source to a grid; and alternating current (AC) to DC power converter modules coupled in series to the system DC link on a source side of the system DC link, each power converter module configured for being coupled to one or more sources on the source side, wherein each power converter module is configured to short circuit the DC terminals of the power converter module upon receipt of a respective command signal.

17 Claims, 3 Drawing Sheets

COLLECTION AND TRANSMISSION SYSTEM

CROSS REFERENCE TO RELATED APPLICATION

This application is being filed concurrently with commonly assigned U.S. patent application Ser. No. 11/608,582 which is herein incorporated by reference.

BACKGROUND

The subject matter disclosed herein relates generally to converter topologies useful for direct current (DC) power transmission.

In distributed generation applications wherein the site for generation is remote from the available electric grid or load point, bulk power is often transmitted over long distances. In an off-shore wind farm, for example, power generated by individual wind turbine generators is processed by power electronic converters to convert variable voltage, variable frequency output to fixed voltage, fixed frequency output. The outputs from the individual generators are synchronized to the utility network frequency even though the individual machines are running at different speeds and hence outputting different frequencies. The power generated from the turbines is then brought together by a collection system that includes transformers and switchgears for isolating individual turbines and stepping up the voltages, usually to tens of kilovolts. The collection network is then cabled to an off-shore substation that boosts up the voltage further, usually to hundreds of kilovolts. It is then transmitted through subsea cable to an on-shore substation, where it is tied to the utility network through isolating switch-gears and transformers.

For applications wherein bulk power is transmitted over long distances, conventional alternating current (AC) transmission provides technical challenges. Capacitance causes charging current to flow along the length of the AC cable. Because the cable must carry this current as well as the useful source current, this physical limitation reduces the source carrying capability of the cable. Because capacitance is distributed along the entire length of the cable, longer lengths result in higher capacitance and higher resulting charging current. As the cable system design voltage is increased to minimize the line losses and voltage drop, the charging current also increases.

DC transmission can be achieved more efficiently over longer distances than AC transmission. Medium voltage (MV) or high voltage (HV) DC transmission typically requires power electronic converters which are capable of converting between HV AC and HV DC. In conventional converter topologies, each switch of the converter is designed to handle high voltages which may range from tens of kilovolts to hundreds of kilovolts depending upon the application. Such switches are typically arranged with series connection of several semiconductor devices such as insulated gate bipolar transistors (IGBTs) and thyristors.

BRIEF DESCRIPTION

It would be desirable to provide a more reliable and efficient collection and transmission system.

A collection and transmission system includes: a system direct current (DC) link configured for carrying power from a source to an electric grid; and alternating current (AC) to DC power converter modules coupled in series to the system DC link on a source side of the system DC link, each power converter module configured for being coupled to one or more sources on the source side, wherein each power converter module is configured to short circuit the DC terminals of the power converter module upon receipt of a respective command signal.

In another embodiment, a collection and transmission method comprises: providing a system DC link configured for carrying power from a plurality of off-shore sources to a grid; coupling at least two AC-to-DC power converter modules in series to the system DC link on a source side of the system DC link; and later coupling at least one additional AC-to-DC power converter module in series to the originally-coupled AC-to-DC power converter modules or decoupling at least one of the originally-coupled AC-to-DC power converter modules.

In another embodiment a collection and transmission method comprises: providing a system DC link configured for carrying power from a source to an electric grid and AC-to-DC power converter modules coupled in series to the system DC link on a source side of the system DC link, each power converter module configured for being coupled to one or more sources on the source side; and in response to a fault, sending a command signal to cause a short circuit of the DC terminals of the power converter module in a respective one of the power converter modules.

In another embodiment, a collection and transmission system comprises: a system direct current (DC) link configured for carrying power from an off-shore source to a grid; and AC-to-DC power converter modules coupled in series to the system DC link on a source side of the system DC link, at least some of the power converter modules configured for being coupled to one or more wind turbines on the source side.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
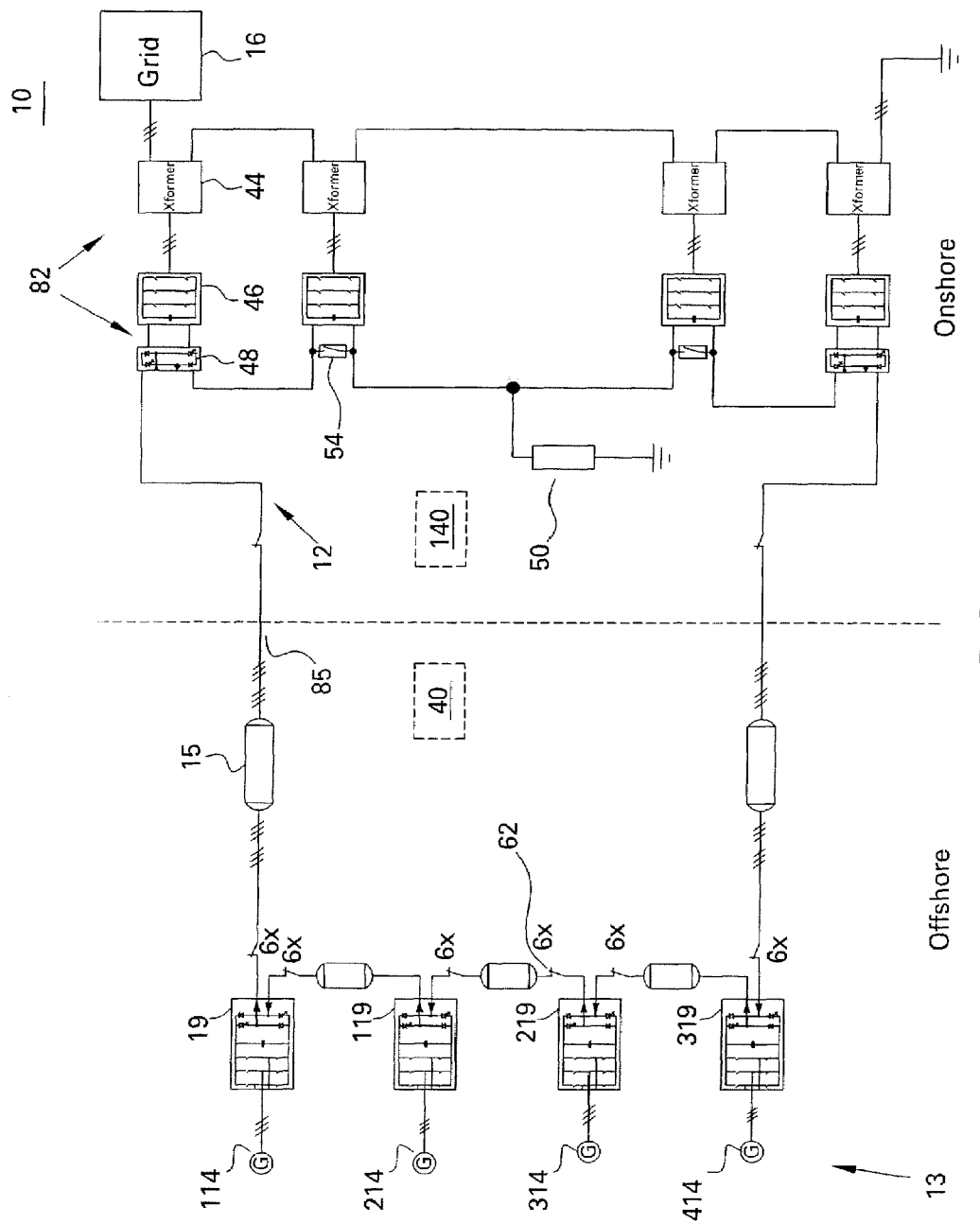
FIG. 1 is a block diagram of one collection and transmission system embodiment disclosed herein.

FIG. 1 is a block diagram of one embodiment disclosed herein wherein a collection and transmission system 10 comprises a system direct current (DC) link 12, configured for carrying power from a source 13 (meaning at least one source) to an electric grid 16, and alternating current (AC) to DC power converter modules 19, 119, 219, 319 coupled in series to system DC link 12 on a source side of the system DC link. Each power converter module is configured for being coupled to one or more sources 114, 214, 314, 414 on the source side. In one embodiment, each power converter module is configured to short circuit the DC terminals of the power converter module upon receipt of a respective command signal.

The embodiment of FIG. 1 is particularly useful for transmitting bulk electrical power from a source to a distant electric grid using DC transmission wherein the DC voltage level is at least medium (for example, at least ten kilovolts). Typically the distances are greater than twenty kilometers but what is considered "distant" will vary depending upon power requirements of the system. Additionally, some applications may exist wherein the benefits of stringing source side power conversion modules in DC are not dependent upon long distances. When used to supply power from sources situated off-shore, the embodiment of FIG. 1 is expected to reduce cost, complexity (number of components such as circuit breakers, transformers, and connectors which may be eliminated or reduced in some aspects of the embodiments disclosed herein, for example), and required space for power conversion equipment.

In one aspect of the embodiment of FIG. 1, one or more of the sources comprise wind turbine generators or, more specifically, generators of wind turbines situated off-shore. In other aspects of the embodiment of FIG. 1, on-shore sources are used or other types of off-shore sources, such as marine based generators, are used, or combinations of different types of sources are used.

The power converter modules typically comprise three phase power converters. In a more specific example, the power converters comprise two level converters, three level converters, or a combination of two level converters and three level converters. In other examples, a higher number of levels may be used.

Within the ring formed by system DC link 12, current going into and coming out of each power converter module will always be the same as that supplied by the source side of collection and transmission system 10. In other words, the source side converter modules maintain the current on the system DC link. The commanded current on the system DC link is selected to be the minimum needed to support the maximum current required by any one of the source side power converter modules 19, 119, 219, 319 to supply appropriate power to the electrical grid. Thus, the collection and transmission system is most efficient when sources of similar capabilities are arranged in series. A feedback loop can be used to enable a controller 40 to determine the system DC link current command. In one embodiment, controller 40 is also useful for driving the current of the system DC link toward the commanded value. As indicated above, the commanded value will typically depend upon the source requirements and may be adjusted from time to time to adapt to changing requirements.

In one embodiment, in contrast to the DC link current being bounded within a relatively narrow range, the voltage of the system DC link is variable from zero to plus or minus a nominal DC link voltage. In embodiments wherein the DC link current is controlled but the DC link voltage is variable, the series-coupled power converter modules may more easily be short-circuited in the event of a fault. This feature enables the elimination or reduction of DC circuit breakers. The nominal voltage need not be high. For example, in one embodiment, the nominal voltage is less than or equal to plus or minus about ten kilovolts. In another example, the nominal voltage is less than or equal to plus or minus about thirty kilovolts.

Figure 2:
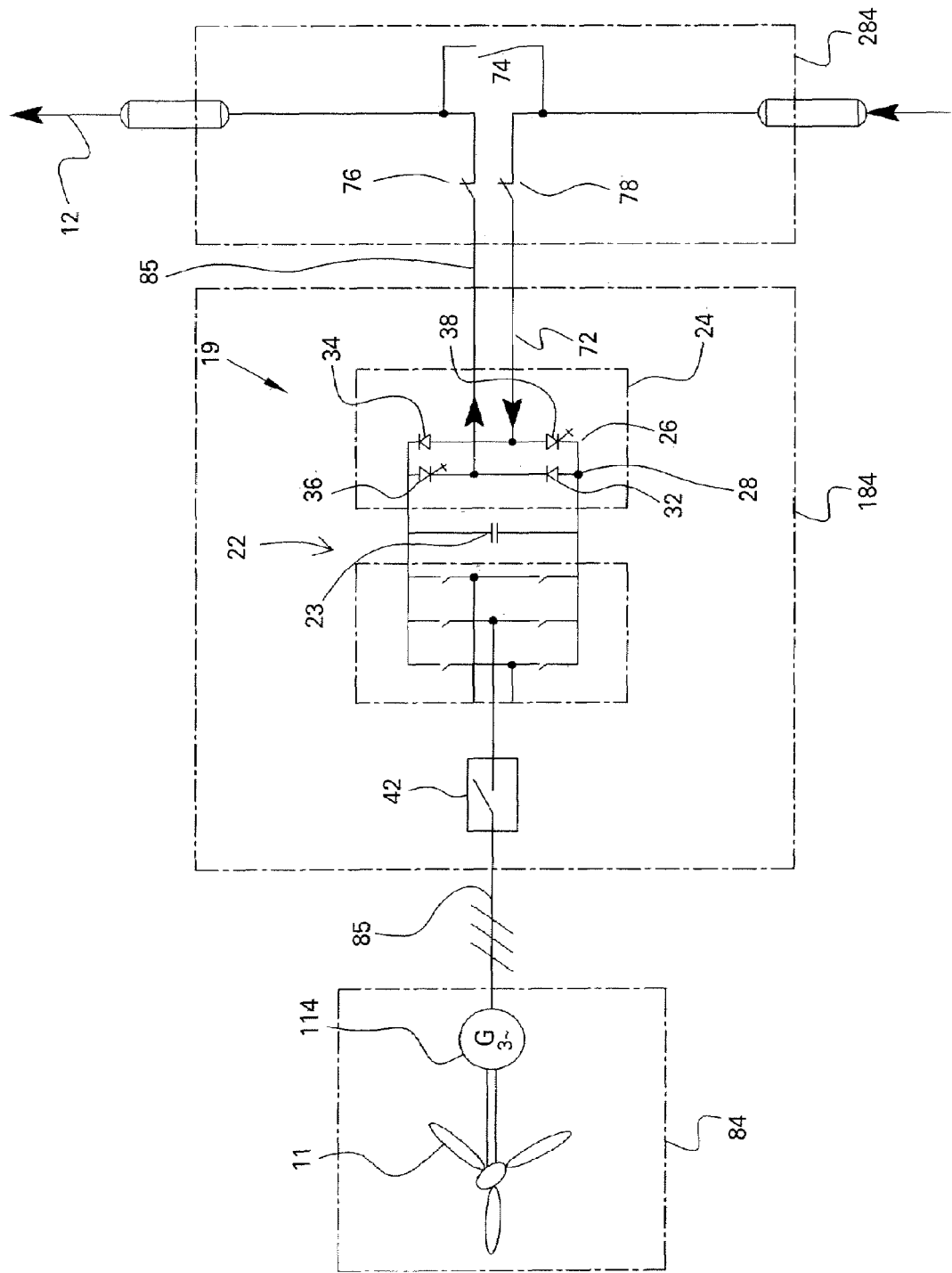
FIG. 2 is a block diagram of one converter embodiment.

In one embodiment which is useful for providing power converter module bypass capability, as shown in larger view in FIG. 2, each source side power converter module comprises rectifier 22 and a half bridge 24 coupled between system DC link 12 and the rectifier. A module DC link 23 couples the half bridge and rectifier. In one example, the half bridge comprises an asymmetrical half bridge. Rectifier 22 may comprise a conventional conversion module using semiconductor switching devices such as IGBTs, GTOs, or transistors along with associated controls.

The half bridge is used for controlling current to the system DC link, whereas the rectifier is used for controlling the module DC link voltage. The power to the system DC link may be adjusted by controlling the current, the voltage, or a combination of the current and voltage. In an exemplary embodiment, at least one half bridge comprises two diode switch pairs 26 and 28 which each in turn comprise one diode 32 or 34 and one switch 36 or 38. The half bridge is configured for receiving input power from the rectifier and transmitting to system DC link 12 when both of the switches 36 and 38 of the diode switch pairs are closed. Switches 36 and 38 may comprise any appropriate switching devices with several examples including IGBTs (insulated gate bipolar transistors) and GTOs (gate turn off thyristors).

When one source supplies less power than others, the fraction of the DC ring current that is not supplied by this source will be bypassed by the respective power converter module and result in some efficiency losses, particularly if there is a large difference in generated power between different sources. The bypass in this example is a partial bypass with the half bridge switches being modulated and the duty ratio being selected to lower the resulting power supplied to the system DC link.

Controller 40 is configured for closing one of switches 36 and 38 in the event of a fault condition. For example, if there is a short circuit in module DC link 23 between half bridge 24 and rectifier 22, the half bridge can bypass the source (that is, bypass and de-couple the source and respective power converter module from the system DC link). Controller 40 may comprise one or more computers or processors (which may be situated locally, remotely, or both locally and remotely) configured for sending command signals to switches of the half bridge and rectifiers, for example, and thus short circuit the DC terminals of the power converter module at the system DC link 12. If either of switches 36 or 38 is closed (that is, turned "on"), then the power converter module is bypassed and, at the same time, no power can be transferred from the source to the system DC link. This short circuiting (or decoupling) feature is useful as an alternative to DC circuit breakers. Another advantage of this embodiment is that a power converter module may independently remain in operation when another (meaning one or more other) of the power converter modules is in a short circuit condition. When one or more power converter modules are bypassed on one side of the system DC link, the resulting system DC link voltage equals the sum of the remaining half-bridge voltages. Controller 140 automatically adjusts the sum of the half-bridge voltages on the other side of the system DC link in order to keep the DC ring current at a constant value. Thus the power transmitted from the source is instantaneously adapted by adapting the system DC link voltage.

Although DC collection and transmission systems have several advantages over AC systems, DC systems are most commonly used in special applications such as military and research applications. One reason is because energy distribution is typically passed on parallel topologies and a short circuit current in a parallel DC topology would be high and include expensive switchgear to perform interrupt functions. When a DC topology is used in an off-shore application with a series connection at the source side, a short circuit in a source module or converter may easily be handled by the following process which is discussed with respect to the embodiment of FIG. 2.

FIG. 2 illustrates a subdivision of a source module into three sections with the first section 84 comprising generator 114 coupled to a wind turbine 11, the second section 184 comprising the power conversion components, and the third section 284 comprising DC switchgear (illustrated by switches 74, 76, and 78, for example). These sections can be installed in one or more containers. If multiple containers are used, such containers may be connected by cables and connectors (not shown) in order to facilitate service and maintenance.

In case of a fault in a source or converter, one of the half-bridge 24 switches 36 and 38 is closed so as to short circuit the half-bridge DC terminals and thus ensure that the rest of the collection and transmission system is not affected by the fault. In parallel, switches in rectifier 22 may be turned off to more quickly isolate the fault. The circuit breaker 42 may be opened to disconnect the source from the power converter module. After this series of switching operations, the only remaining current in the source will be the system DC link current flowing over the short-circuited half-bridge. In one embodiment, a switch 74 is closed in order to permit the capacitance of module DC link 23 to be discharged, after closing both switches 36 and 38. In this embodiment, the half-bridge is designed to withstand the maximum discharge current for a few milliseconds. Then the switches 36 and 38 may be opened along with switches 76 and 78 at which point the source converter is now completely separated from the source and the collection and transmission system and can be withdrawn for maintenance, repair or replacement while the collection and transmission system stays in operation. Later reinsertion of the converter module is possible by short-circuiting the half-bridge and then opening switch 74.

Figure 3:
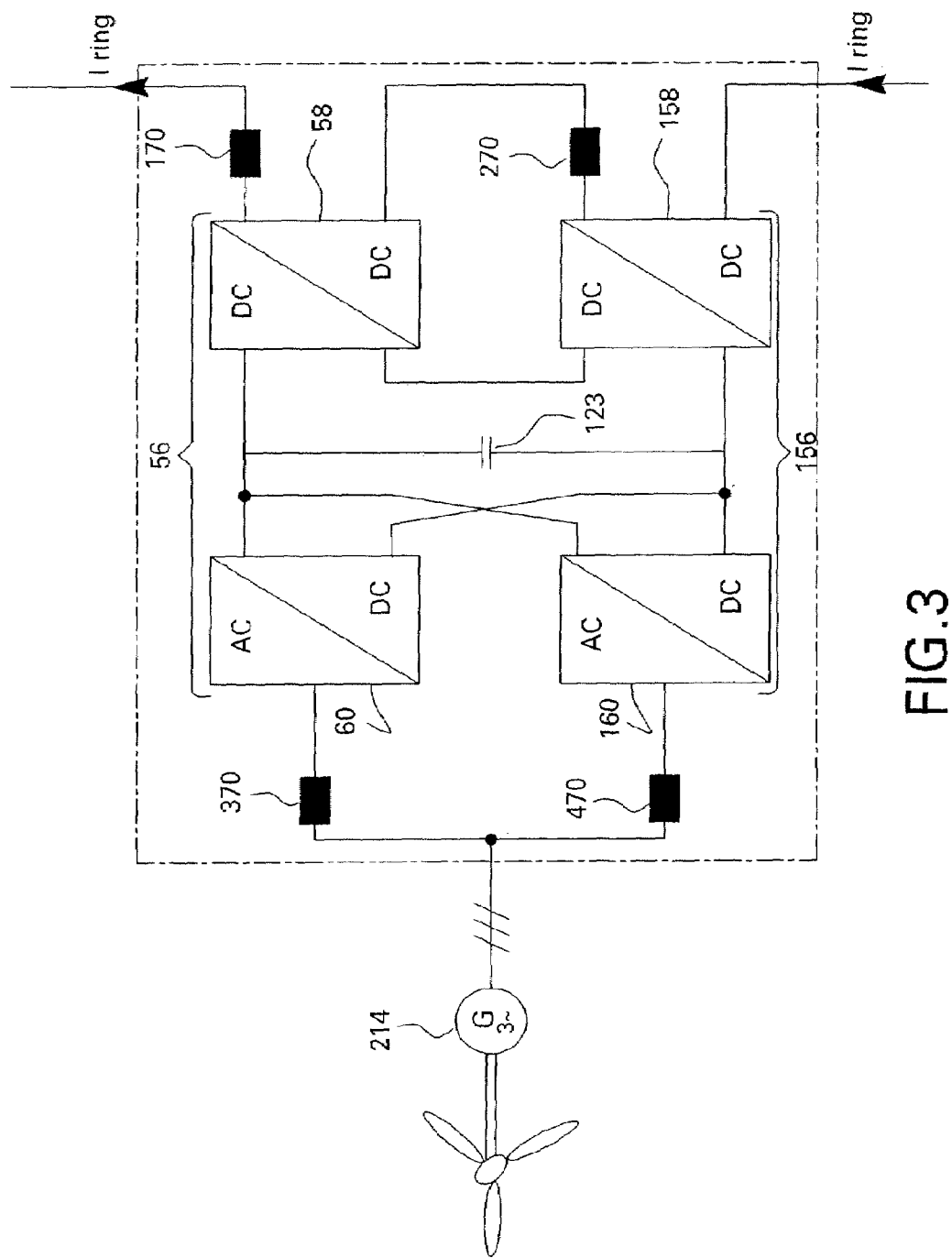
FIG. 3 is a block diagram of another converter embodiment.

FIG. 3 is a block diagram of an example of a modular redundancy embodiment wherein at least one power converter module 119 comprises at least two subconverter modules 56 and 156 between system DC link 123 and a respective generator 214. Modular redundancy is one technique which may be used to increase system reliability. FIG. 3 additionally illustrates an embodiment wherein the two subconverter modules comprise at least two DC-to-DC converters 58 and 158 coupled in series across the module DC link, at least two AC-to-DC converters 60 and 160 coupled in parallel to the generator, and a module DC link 123, coupling the series-coupled DC-to-DC converters to the parallel-coupled AC-to-DC converters. Although two DC-to-DC converters 58 and 158 and two AC-to-DC converters 60 and 160 are shown, additional converter may be coupled if increased redundancy is desired. Because the overall proposed system described herein requires less space in a converter container as compared with conventional AC-to-AC conversion embodiments, is possible to use the same amount of space and include the subconverter module embodiments to build in higher redundancy than in conventional converter designs.

Embodiments providing such redundancy are useful to ensure that generator 214 may still supply power if a DC-to-DC converter fails (so long as at least one other DC-to-DC converter is still operational) or if a AC-to-DC converter fails (so long as at least one other AC-to-DC converter is still operational). In a similar manner as discussed with respect to FIG. 2, upon a converter fault, for DC-to-DC converter faults the faulted converter may be short circuited or for AC-to-DC converter faults the faulted converter may be switched off.

FIG. 3 additionally illustrates inductors 170, 270, 370, and 470 which may comprise either discrete elements or be present as a natural inductance in the lines and are also typically present (but not shown) in the embodiment of FIG. 2. When used in combination with the DC-to-DC converters, the inductors reduce the harmonic content of the voltage in the system DC link which is caused by switching the DC-to-DC converters. AC-to-DC converters having inductors coupled thereto may optionally be operated in an interleaved mode in order to improve the quality of the current being exchanged with the source.

Bypassing of a subconverter module or a source may be accomplished with or without system interruption. If a single module is experiencing a DC link fault, module DC link 23 may be short circuited by adjusting the half bridge switches, and the voltage will be obtained across other module DC links. When redundant subconverter modules are positioned in parallel and one is at fault, the other can receive current from the source while the faulted subconverter module is switched off. If a source is in a fault condition, a circuit breaker associated with the source may be tripped.

In one embodiment, grid side DC-to-AC power converter modules 82 are coupled in series to system DC link 12 as described with respect to the cross-referenced related application. In a more specific aspect of this embodiment, half bridges 48 may additionally be present in the grid side power converter modules to enhance bypass capability. In the example of FIG. 1, a combination of half-bridges 48 and bypass switches 54 are used to simplify the embodiment and reduce cost of the collection and transmission system. Although there are efficiency benefits to the illustrated embodiment, it is an optional embodiment and any appropriate grid side configuration may be used to supply DC power from the system DC link with one example being a current controlled thyristor converter configuration (not shown).

Phase shifting features may be useful in some embodiments. In one example, each of the grid side power converter modules 82 comprises a phase-shifting transformer 44 and an inverter 46 coupled between the phase-shifting transformer and the system DC link. In another example, a controller 140 (which is typically separate from controller 40 but may optionally be part of controller 40) directs switching in an inverter of a grid side power converter module in response to a phase shift of a respective transformer. Phase shifting embodiments are described in commonly assigned U.S. patent application Ser. Nos. 11/010,147 and 11/095,227 and can be useful for improving power quality and enabling redundant modes of operation.

The cables 85 on system DC link 12 may comprise any appropriate material which does not degrade when subject to DC voltages. Several examples include ethylene propelyne rubber AC cables and polymer DC cables. In one specific example intended to enable redundancy, two three phase AC cables are used. In an alternative more specific example, six parallel DC cables are used. Cable housings of DC system link 12 are represented by element 15 of FIG. 1. These embodiments are for purposes of example, and other numbers of cables may be used.

The ring formed by system DC link 12 and the series connections in the example of FIG. 1 is grounded through an impedance 50 in order to avoid interruptions from pole-to-earth faults. Ideally impedance 50 will be of sufficient magnitude to provide insulation for the voltage difference across the system DC link. In an example wherein a top line of the system DC link is set at +12 kilovolts and negative line is set at −12 kilovolts, the impedance is set to provide insulation for up to 24 kilovolts.

When a cable carries single pole currents, bipolar faults are a low probability. If a problematic pole-to-earth fault occurs, it can be isolated. In one embodiment, the cable of DC power link 12 comprises parallel cables with enough current-carrying capacity to enable the disconnection of a faulted cable core without required interruptions. In this embodiment, if a pole-to-earth fault occurs, the load interrupters 62 which may be installed at the input and one at the output of each single cable section (only several of which are shown in FIG. 1 for purposes of illustration), are switched in sequence until the fault is eliminated. In one example wherein there are six parallel switches at the input and output of each subsea cable section, sequential switching means that one sub-cable after another is switched off (by simultaneously switching off the input and output switches of a sub-cable). Thus, each sub-cable is for a short time completely separated from the power system (while the other sub-cables still carry the ring current). If there is an earth fault in one of the sub-cables, it will disappear when this sub cable is completely switched off. Subsequently switching off one sub-cable after another in all cable sections enables the elimination of an earth fault while the system can stay in operation.

One advantage of the embodiments disclosed herein is the flexibility that is provided by stringing the power converter modules in series. In one embodiment, a collection and transmission method comprises providing a system DC link 12 configured for carrying power from a plurality of off-shore sources 14 to a grid 16; coupling at least two AC-to-DC power converter modules in series to the system DC link on a source side of the system DC link; and later coupling at least one additional AC-to-DC power converter module in series to the originally-coupled AC-to-DC power converter modules or decoupling (with the "or" meaning either or both) at least one of originally-coupled AC-to-DC power converter modules.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A collection and transmission system comprising:
a system direct current (DC) link configured for carrying power from a source to an electrical grid; and
alternating current (AC) to DC power converter modules coupled in series to the system DC link on a source side of the system DC link, each power converter module configured for being coupled to one or more sources on the source side, wherein each power converter module is configured to short circuit the terminals of the power converter module and de-couple the power converter module from the DC link in an event of fault upon receipt of a respective command signal;
wherein at least some of the converter modules comprise a rectifier and a half bridge coupled between to the system DC link and the rectifier, wherein at least one half bridge comprises two diode switch pairs, and is configured for transmitting input power from the rectifier when both of the switches of the diode switch pairs are closed, and further comprising a controller configured for closing one of the switches in the event of fault.

2. The system of claim 1 wherein each power converter module is configured to independently remain in operation when another of the power converter modules is in a short circuit condition.

3. The system of claim 1 wherein at least some of the one or more sources comprise wind turbine generators.

4. The system of claim 3 wherein at least some of the wind turbine generators are situated off-shore.

5. The system of claim 1 wherein at least one power converter module comprises at least two subconverter modules.

6. The system of claim 5 wherein the two subconverter modules comprise at least two DC-to-DC converters coupled in series across the system DC link, at least two AC-to-DC converters coupled in parallel to the source, and a module DC link coupling the series-coupled DC-to-DC converters to the parallel-coupled AC-to-DC converters.

7. The system of claim 1 further comprising a controller for driving a current of the system DC link toward a commanded value and wherein a voltage of the system DC link is variable from zero to a nominal DC link voltage.

8. The system of claim 7 wherein the nominal voltage is less than or equal to about 30 kilovolts.

9. The system of claim 1 further comprising additional power converter modules situated on a grid side of the system DC link, and wherein each of the grid side power converter modules comprises a phase-shifting transformer and an inverter coupled between the phase-shifting transformer and the system DC link.

10. The system of claim 1 further comprising additional power converter modules situated on a grid side of the system DC link, wherein each of the grid side power converter modules comprises a transformer and an inverter coupled between the transformer and the system DC link, and a controller for controlling switching in the inverter of the grid side power converter module in response to a phase shift of a respective transformer.

11. A collection and transmission method comprising:
providing a system direct current (DC) link configured for carrying power from a plurality of off-shore sources to a grid;
coupling at least two alternating current (AC) to DC power converter modules in series to the system DC link on a source side of the system DC link; and
later coupling at least one additional AC-to-DC power converter module in series to the originally-coupled AC-to-DC power converter modules or decoupling at least one of the originally-coupled AC-to-DC power converter modules
wherein at least some of the converter modules comprise a rectifier and a half bridge coupled between the system DC link and the rectifier, wherein at least one half bridge comprises two diode switch pairs, and is configured for transmitting input power from the rectifier when both of the switches of the diode switch pairs are closed, and further comprising a controller configured for closing one of the switches in the event of a fault condition.

12. The method of claim 11 wherein the sources comprises a plurality of wind turbine generators.

13. A collection and transmission method comprising:
providing a system direct current (DC) link configured for carrying power from a source to a grid and alternating current (AC) to DC power converter modules coupled in series to the system DC link on a source side of the system DC link, each power converter module configured for being coupled to one or more sources on the source side; and in response to a fault, sending a command signal to short circuit the terminals of the power converter module and de-couple the power converter module from the DC link in an event of fault in a respective one of the power converter modules, wherein at least some of the converter modules comprise a rectifier and a half bridge coupled between the system DC link and the rectifier, wherein at least one half bridge comprises two diode switch pairs; and configuring the rectifier to transmit power to the grid when both of the switches of the diode switch pairs are closed, and further comprising a controller configured for closing one of the switches in the event of a fault condition.

14. The method of claim 13 wherein each power converter module is configured to independently remain in operation when another of the power converter modules is in a short circuit condition.

15. The method of claim 13 wherein at least some of the one or more generators comprise wind turbine generators.

16. The method of claim 15 wherein at least some of the wind turbine generators are situated off-shore.

17. The method of claim 15 further comprising driving a current of the system DC link toward a commanded value and wherein a voltage of the system DC link is variable from zero to a nominal DC link voltage.

* * * * *

UNITED STATES PATENT AND TRADEMARK OFFICE
CERTIFICATE OF CORRECTION

PATENT NO. : 7,633,770 B2
APPLICATION NO. : 11/608570
DATED : December 15, 2009
INVENTOR(S) : Datta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Ninth Day of November, 2010

David J. Kappos
*Director of the United States Patent and Trademark Office*